US010412346B1

(12) United States Patent
Yu

(10) Patent No.: US 10,412,346 B1
(45) Date of Patent: Sep. 10, 2019

(54) DUAL VIDEO SIGNAL MONITORING AND MANAGEMENT OF A PERSONAL INTERNET PROTOCOL SURVEILLANCE CAMERA

(71) Applicant: Chengfu Yu, Irvine, CA (US)

(72) Inventor: Chengfu Yu, Irvine, CA (US)

( * ) Notice: Subject to any disclaimer, the term of this patent is extended or adjusted under 35 U.S.C. 154(b) by 0 days.

(21) Appl. No.: 15/454,446

(22) Filed: Mar. 9, 2017

(51) Int. Cl.
| | |
|---|---|
| *H04N 7/18* | (2006.01) |
| *G06N 99/00* | (2019.01) |
| *H04L 29/08* | (2006.01) |
| *H04L 12/58* | (2006.01) |
| *H04L 29/06* | (2006.01) |
| *H04W 12/06* | (2009.01) |
| *H04W 12/08* | (2009.01) |
| *H04W 76/14* | (2018.01) |
| *G06N 20/00* | (2019.01) |

(52) U.S. Cl.
CPC ............ *H04N 7/183* (2013.01); *G06N 20/00* (2019.01); *H04L 51/046* (2013.01); *H04L 51/08* (2013.01); *H04L 65/4069* (2013.01); *H04L 67/10* (2013.01); *H04L 67/26* (2013.01); *H04W 12/06* (2013.01); *H04W 12/08* (2013.01); *H04W 76/14* (2018.02)

(58) Field of Classification Search
CPC .............................. H04N 7/183; G06N 99/005
See application file for complete search history.

(56) References Cited

U.S. PATENT DOCUMENTS

| | | | | |
|---|---|---|---|---|
| 7,123,820 B2 * | 10/2006 | Shimizu | ................. | H04N 7/181 386/223 |
| 9,055,062 B1 * | 6/2015 | Huang | ................ | H04L 63/0884 |
| 9,148,618 B2 * | 9/2015 | Matas | .................... | H04N 5/772 |
| 9,800,954 B2 * | 10/2017 | Abrams | ................. | H04N 5/247 |

(Continued)

*Primary Examiner* — Jayanti K Patel
*Assistant Examiner* — Irfan Habib
(74) *Attorney, Agent, or Firm* — Arman Khosraviani

(57) ABSTRACT

A wireless user device is disclosed. The wireless user device includes, one or more processors, a machine-readable medium including instructions stored therein, which, when executed by the one or more processors cause the one or more processors to perform operations including, sending, by the wireless user device, a request to authenticate a user account on a cloud-based service, wherein the request comprises user credentials to the user account on the cloud-based service, wherein the cloud-based service is associated with a server, and wherein the wireless user device is associated to the user account in response to a successful authentication of the user credentials. The operations further includes, receiving, from the server, an alert message associated with a live-scene, wherein the alert message and a video recording are in response to a triggering event detected by one or more sensors of a device; transmitting, in response to the alert message, to the server a request to forward to the wireless user device the video recording and a live-streaming video of the live-scene; receiving the video recording and the live-streaming video subsequent to transmitting the request; and displaying the video recording and the live-streaming video simultaneously on the wireless user device, wherein the location of the video recording within a displaying screen and the location of live-streaming video within the displaying screen are adjustable.

26 Claims, 8 Drawing Sheets

(56) References Cited

U.S. PATENT DOCUMENTS

| | | | |
|---|---|---|---|
| 2002/0163577 A1* | 11/2002 | Myers | G08B 13/19643 348/152 |
| 2006/0221184 A1* | 10/2006 | Vallone | G08B 13/19682 348/155 |
| 2007/0217761 A1* | 9/2007 | Chen | H04N 5/772 386/228 |
| 2012/0014659 A1* | 1/2012 | Hugosson | G08B 13/19669 386/228 |
| 2012/0166952 A1* | 6/2012 | Alexandrov | G06Q 10/101 715/730 |
| 2014/0101082 A1* | 4/2014 | Matsuoka | H04L 12/2829 706/12 |
| 2014/0306802 A1* | 10/2014 | Hibbs, Jr. | G08B 27/006 340/7.58 |
| 2015/0065078 A1* | 3/2015 | Mejia | G08B 17/00 455/404.1 |
| 2015/0100167 A1* | 4/2015 | Sloo | F24F 11/30 700/278 |
| 2015/0145693 A1* | 5/2015 | Toriumi | A61B 5/746 340/870.17 |
| 2015/0262435 A1* | 9/2015 | Delong | G07C 5/0816 340/439 |
| 2015/0304375 A1* | 10/2015 | Dhillon | H04L 65/4007 370/259 |
| 2015/0339912 A1* | 11/2015 | Farrand | G08B 25/001 340/501 |
| 2015/0350611 A1* | 12/2015 | Pearson | G06F 16/51 348/158 |
| 2015/0358584 A1* | 12/2015 | Mattson | H04N 7/15 348/14.08 |
| 2016/0012702 A1* | 1/2016 | Hart | G08B 21/043 340/584 |
| 2016/0092044 A1* | 3/2016 | Laska | G06K 9/00711 715/721 |
| 2016/0134922 A1* | 5/2016 | Bogers | H04N 21/4126 725/80 |
| 2016/0142758 A1* | 5/2016 | Karp | H04W 4/80 725/25 |
| 2016/0193530 A1* | 7/2016 | Parker | A63F 13/65 463/29 |
| 2016/0240074 A1 | 8/2016 | Probin et al. | |

\* cited by examiner

DUAL VIDEO SIGNAL MONITORING AND MANAGEMENT OF A PERSONAL INTERNET PROTOCOL SURVEILLANCE CAMERA

CROSS-REFERENCE TO RELATED APPLICATIONS

The entire contents of the following application are incorporated herein by reference: U.S. Nonprovisional patent application Ser. No. 15/386,670: filed on Dec. 21, 2016; and entitled AUTONOMOUS PAIRING OF INTERNET OF THINGS DEVICES.

TECHNICAL FIELD

The present disclosure generally relates to internet of things (IoT) devices and in particular, for example, to personal Internet protocol (IP) surveillance camera.

BACKGROUND

The IP camera is a type of digital video camera commonly employed for surveillance, and which, unlike analog closed circuit television (CCTV) cameras, can send and receive data via a computer network and the Internet. There are two kinds of IP cameras: Centralized IP cameras, which require a central network video recorder (NVR) to handle the recording, video and alarm management and Decentralized IP cameras, which do not require a central NVR, as the cameras have recording function built-in and can thus record directly to any standard storage media, such as SD cards, NAS (network attached storage) or a personal computer (PC)/server. IP cameras are utilized in the home as a less expensive option to a user to surveillance his home or any other small area. There are a number of IP cameras in the market, but most IP cameras are lacking in features that improve functionality, efficiency and ease of use of the IP cameras as surveillance cameras. For example, IP camera deployed in homes provide to a user either a live-streaming view or access to a pre-recoded data base of the same view at a time. Accordingly, there is a need in the art to improve functionality, efficiency and ease of use of IP surveillance cameras.

SUMMARY

The disclosed subject matter relates to a wireless user device. The wireless user device includes, one or more processors, a machine-readable medium including instructions stored therein, which, when executed by the one or more processors cause the one or more processors to perform operations including, sending, by the wireless user device, a request to authenticate a user account on a cloud-based service, wherein the request comprises user credentials to the user account on the cloud-based service, wherein the cloud-based service is associated with a server, and wherein the wireless user device is associated to the user account in response to a successful authentication of the user credentials. The operations further includes, receiving, from the server, an alert message associated with a live-scene, wherein the alert message and a video recording are in response to a triggering event detected by one or more sensors of a device; transmitting, in response to the alert message, to the server a request to forward to the wireless user device the video recording and a live-streaming video of the live-scene; receiving the video recording and the live-streaming video subsequent to transmitting the request; and displaying the video recording and the live-streaming video simultaneously on the wireless user device, wherein the location of the video recording within a displaying screen and the location of live-streaming video within the displaying screen are adjustable.

The disclosed subject matter also relates to a method, wherein the method includes receiving, by a server, an alert message and a video recording in response to a triggering event of a live-scene detected by one or more sensors of a device, associating the alert message and the video recording to a user account on a cloud-based service on the server, pushing the alert message to a wireless user device associated with the user account, receiving a user request from the wireless user device, the user request being for the video recording and a live-streaming video of the live-scene, and providing the video recording and the live-streaming video for display by the wireless user device in response to the user request.

The disclosed subject matter further relates to a non-transitory machine-readable medium including instructions stored therein, which. when executed by one or more processors of a processing system cause the one or more processors to perform operations including, sending, by the wireless user device, a request to authenticate a user account on a cloud-based service, wherein the request comprises user credentials to the user account on the cloud-based service, wherein the cloud-based service is associated with a server, and wherein the wireless user device is associated to the user account in response to a successful authentication of the user credentials. The operations further include, receiving, from the server, an alert message associated with a live-scene, wherein the alert message and a video recording are in response to a triggering event detected by one or more sensors of a device, transmitting, in response to the alert message, to the server a request to forward to the wireless user device the video recording and a live-streaming video of the live-scene, receiving the video recording and the live-streaming video subsequent to transmitting the request, and displaying the video recording and the live-streaming video simultaneously on the wireless user device, wherein the location of the video recording within a displaying screen and the location of live-streaming video within the displaying screen are adjustable.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

Certain features of the present disclosure are set forth in the appended claims. However, for purpose of explanation, several implementations of the present disclosure are set forth in the following figures.

Figure 1:
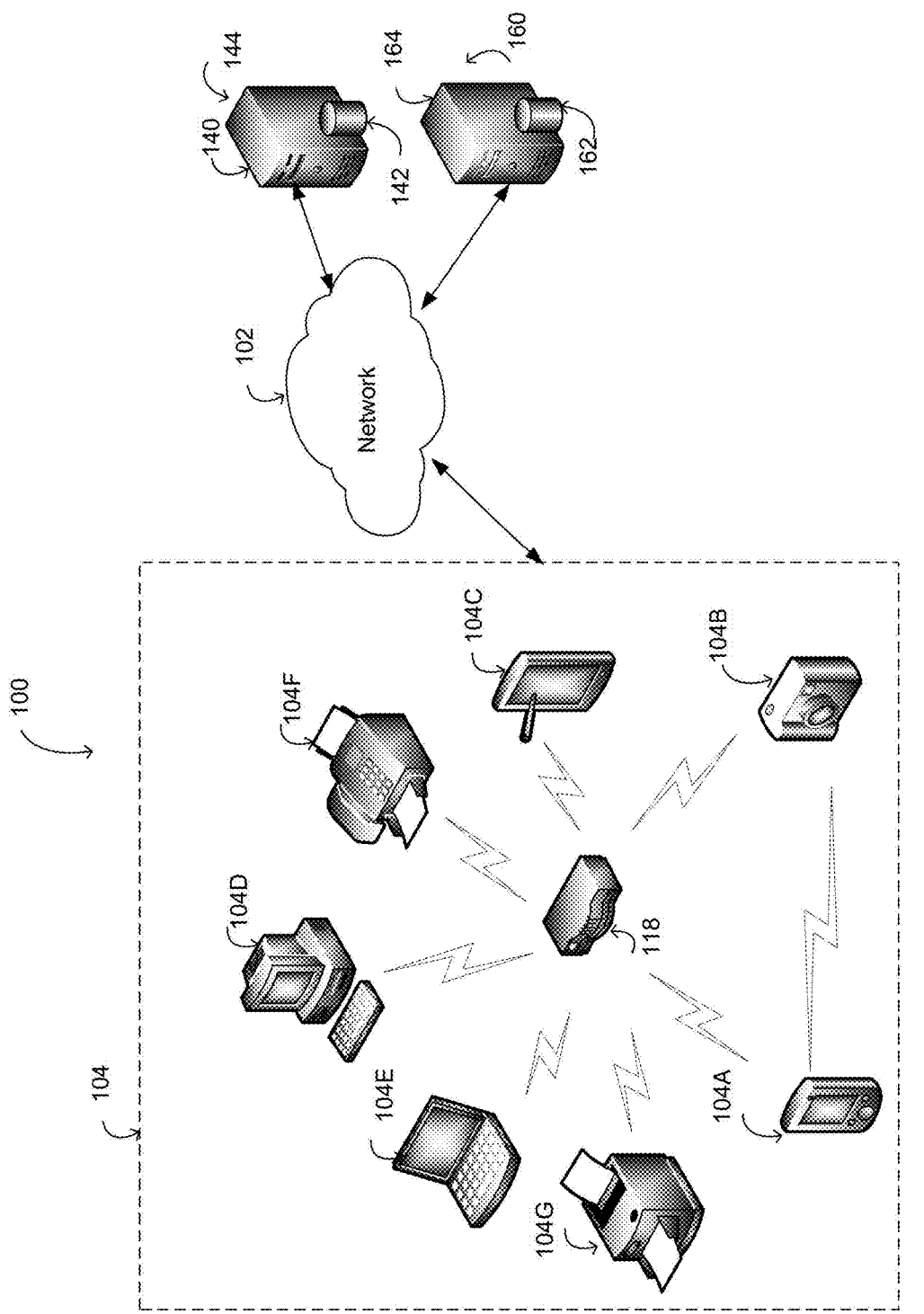
FIG. 1 illustrates an exemplary network environment for dual video signal monitoring and management of an IP protocol surveillance camera in accordance with one or more embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

The detailed description includes specific details for the purpose of providing a thorough understanding of the present disclosure. However, the present disclosure is not limited to the specific details set forth herein and may be practiced without these specific details. In some instances, structures and components are shown in block diagram form to avoid obscuring the concept of the present disclosure.

The present disclosure addresses an improvement to functionality, efficiency and ease of use of IP surveillance cameras and discloses a method that utilizes one or more sensors, where the sensors may be audio, image and/or motion sensors. When the one or more sensors are triggered, an alert message in response to the triggering event is generated. A video recording of the triggering event is also generated. The video recording includes a recording of the triggering event and may have a predetermined length of time recording. The alert message and the video recording are forwarded to a server and are associated to a user account on a cloud-based service on the server. The alert message is then pushed to a wireless user device associated with the user account. In response to the alert message a user may request the video recording and a live-streaming video be sent to the wireless user device from the server. In response to the user request the video recording and the live-streaming video are forwarded to the wireless user device. The video recording and the live-streaming video are then displayed simultaneously on a display screen of the wireless user device, such that the location of the video recording and the location of live-streaming video are adjustable by the user for better viewing.

In some aspects of the technology, a first preference is to forward the live-streaming video to the wireless user device utilizing an established peer-to-peer (P2P) communication channel, and a second preference is to upload the live-streaming video to the server and forward the live-streaming video to the wireless user device by the server. The live-streaming video is forwarded to the server until a P2P communication channel is established. Then the live-streaming video is rerouted to the wireless user device through the newly established P2P communication channel instead of through the router.

In one or more implementations, a user profile associated with the user account may include prioritization information of wireless user devices to receive the alert message and the video recording and the selection of the wireless user device to forward the alert message and the video recording is determined based on the prioritization information. In another aspect, the alert message is generated in response to an image data.

In some aspects of the technology and prior to pushing, the alert message and the video recording to the wireless user device, the video recording is assessed by the server and a decision is made on whether to push the alert message and the video recording to the wireless user device based on the assessment, where the assessment is based on an algorithm and a database associated with the user account. Further, the alert message may include an inquiry to a user on the wireless user device of a classification or a categorization for the video recording, where the classification marks the video recording as a security-breach or a non-security-breach, and where the classification is communicated to the server. The server utilizes the classification in enhancing the algorithm and the database associated with the user account. In one or more implementations, the algorithm is a machine learning program.

The method of the subject disclosure may include a request from a wireless user device to authenticate a user account on a cloud-based service. The request may at least include user credentials to the user account on the cloud-based service where the cloud-based service is associated with a server. The method further associates the wireless user device to the user account in response to a successful authentication of the user credentials.

In one or more implementations, the alert message and the video recording are pushed to the wireless user device simultaneously. In response to the alert message a user request for only a live-streaming video is forwarded to the server. In response to the request, the live-streaming is either communicated over an established P2P communication channel or forwarded to the server to pass to the wireless user device in the event no P2P channel is established.

FIG. 1 illustrates an exemplary network environment 100 for dual video signal monitoring and management of an IP protocol surveillance camera in accordance with one or more embodiments of the present disclosure. Network environment 100 includes wireless local network area 104, network 102, and servers 140 and 160. Wireless local network area 104 may include computing devices 104A-104E, peripheral devices 104F and 104G, and wireless access point 118. Servers 140 and 160 may include computing devices 144 and 164 and computer-readable storage devices 142 and 162. The network environment 100 includes a wireless access point 118 that directs communication between computing devices (104A-104E), peripheral devices (104F and 104G) and network 102. One or more of networks 102 and 104 may be referred to as an IoT network and/or a machine-to-machine (M2M) network and computing devices (104A-104E), peripheral devices (104F and 104G) are IoT devices.

In some aspects, network environment 100 can be a distributed client/server system that spans one or more networks such as, for example, network 102. Network 102 can be a large computer network such as, for example, wide area network (WAN), the Internet, a cellular network, or a combination thereof connecting any number of mobile clients, fixed clients, and servers. Further, the network 102 can include, but is not limited to, any of the following network topologies, including a bus network, a star network, a ring network, a mesh network, a star-bus network, tree or hierarchical network, and the like. In some aspects, communication between computing devices (104A-104E) and servers 140 and 160 can occur via a virtual private network (VPN), Secure Shell (SSH) tunnel, or other secure network connection. In some aspects, network 102 may further include a corporate network (e.g., intranet) and one or more wireless access points.

Wireless local area network 104 can include, but is not limited to, a computer network that covers a limited geographic area (e.g., a home, school, computer laboratory, or office building) using a wireless distribution method (e.g., spread-spectrum or OFDM). Wireless client devices 104A may associate with wireless access point 118 to access wireless local, area network 104 using WiFi standards (e.g., IEEE 802.11). Wireless access point 118 may include other network components in addition to a wireless access point. For example, wireless access point 118 may include a router, switch, bridge, broadband modem etc. According to aspects of the subject technology, wireless access point 118 is a wireless router, that provides both access point functionality and network routing functionality.

Server 140 may be any system or device having a processor, a memory, and communications capability for providing content and/or services to the client devices 104A-104E, for example. In some example aspects, the server 140 can include a single computing device 144, for example, or can include more than one computing device working together to perform the actions of a server (e.g., cloud computing, server farm). Further, the server 140 can represent various forms of servers including, but not limited to, a web server, an application server, a proxy server, etc.

Similarly, server 160 may be any system or device having a processor, a memory, and communications capability for providing content and/or services to the client devices 104A-104E, for example. In some example aspects, the server 160 can be a single computing device 164, for example, or can include more than one computing device working together to perform the actions of a server (e.g., cloud computing, server farm). Further, the server 160 can represent various forms of servers including, but not limited to, a web server, an application server, a proxy server, etc.

A cloud-based service may include services provided by one or more servers, such as server 140 and server 160, via one or more networks, such as network 102. Cloud-based services may require authentication of user account credentials for access via a cloud-based application, such as a web-based personal portal, a web-based email application, etc. A cloud-based service may include a social networking service. A social networking service may enable users to create a profile and associate with other users of the social networking service. For example, a user of a social networking service may have different groups of friends, coworkers, and family, and there may be some overlap among those groups (e.g., a coworker who is also considered to be a friend, a family member who is also a coworker), A social networking service may allow users to share content and messages with other users of the social networking service.

Each of computing devices 104A-104E may represent various forms of processing devices. By way of example and without limitation, processing, devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 1, the computing devices 104A-104E connect and communicate with the wireless access point 118 using wireless links. These wireless links may be established and managed using various protocols including the IEEE 802.11 protocols. The computing devices 104A-104E may communicate wirelessly through a communication interface (not shown), which may include digital signal processing circuitry. In addition to the IEEE 802.11 protocols, the communication interface may provide for communications under other modes or protocols such as, for example. Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

One or more of the devices 104A-104E may be referred to as an IoT device and/or an M2M device and may include human-machine interface (HMI) applications and machine-interface applications. There may be multiple paths between one or more of the devices 104A-104G and/or one or more of the networks 102 and 104. In one or more implementations, devices 104A-104G may utilize a peer-to-peer (P2) network to establish a communication channel between the devices. One or more of the devices 104A-104G may include or may be a sensor that measures a physical quantity from surrounding environment and convert physical quantities into a signal. Examples of sensors include, by way of illustration only and not by way of limitation, temperature sensors, video cameras, audio recorders, motion sensors, humidity sensors, smoke detectors and other sensors.

In one or more implementations, devices 104A-104G may include one or more of active devices, passive devices and/or implemented wholly or partially as system on chip devices. Devices 104A-104G may include a transmitter, a receiver, a Global Positioning System (GPS), a Bluetooth (BT)/BLE transceiver and/or a WiFi™ transceiver. In one or more implementations, network 104 may include one or more network access points, such as, a wireless access point (WAP) where the WAP is capable of transmitting a user datagram packet (UDP), where network 104 do not need to have a pre-established network connection with receiving devices to transmit the UDP packet. In some aspects of technology, one or more of the devices 104A-104G are configured to connect to a wireless access point such as WAP 118 to join a local area network such as local area network 104 utilizing Danale Inc. SMARTADD™ technology.

Peripheral devices 104F and 104G represent devices that provide different functionality to users of the wireless local area network 104. For example, peripheral devices 104E and 104E may be a printer or a multifunction machine that combines printing, scanning and fax functionality, for example. Peripheral devices 104F and 104G may communicate with the wireless access point 118 via a wireless link or may communicate with the wireless access point 118 via a wired connection.

According to aspects of the subject technology, wireless user device 104A (e.g., a smart phone) and IoT device 104E (e.g., an IP camera) may request access to the wireless local area network (LAN) 104 based on network access credentials (e.g., SSID and password). Request to join local area network is authenticated by wireless access point 118 and access is granted based on successful authentication. In, one or more implementations, IoT device 104B is granted access to wireless local network 104 utilizing wireless user device 104A to get network access credentials and joins LAN 104 utilizing the network access credentials. In some aspects, wireless user device 104A employs UDP packets or transmission communication protocol (TCP) packets, to communicate the network access credentials to IoT device 1048.

According to aspects of the subject technology, the IoT device 104B is associated to a user account in a cloud-based service provided by server 140, for example. The user account has a user profile associated to the user. The user profile may contain information and preferences related to wireless user computing devices. The user profile, for example, may include information on prioritization of wireless computing devices to contact. For example, the user may prioritize contacting him on a smart phone device or a personal computer, rather than at his smart television, to receive information/alerts associated with potential security breach from an IP camera 104B.

Figure 2:
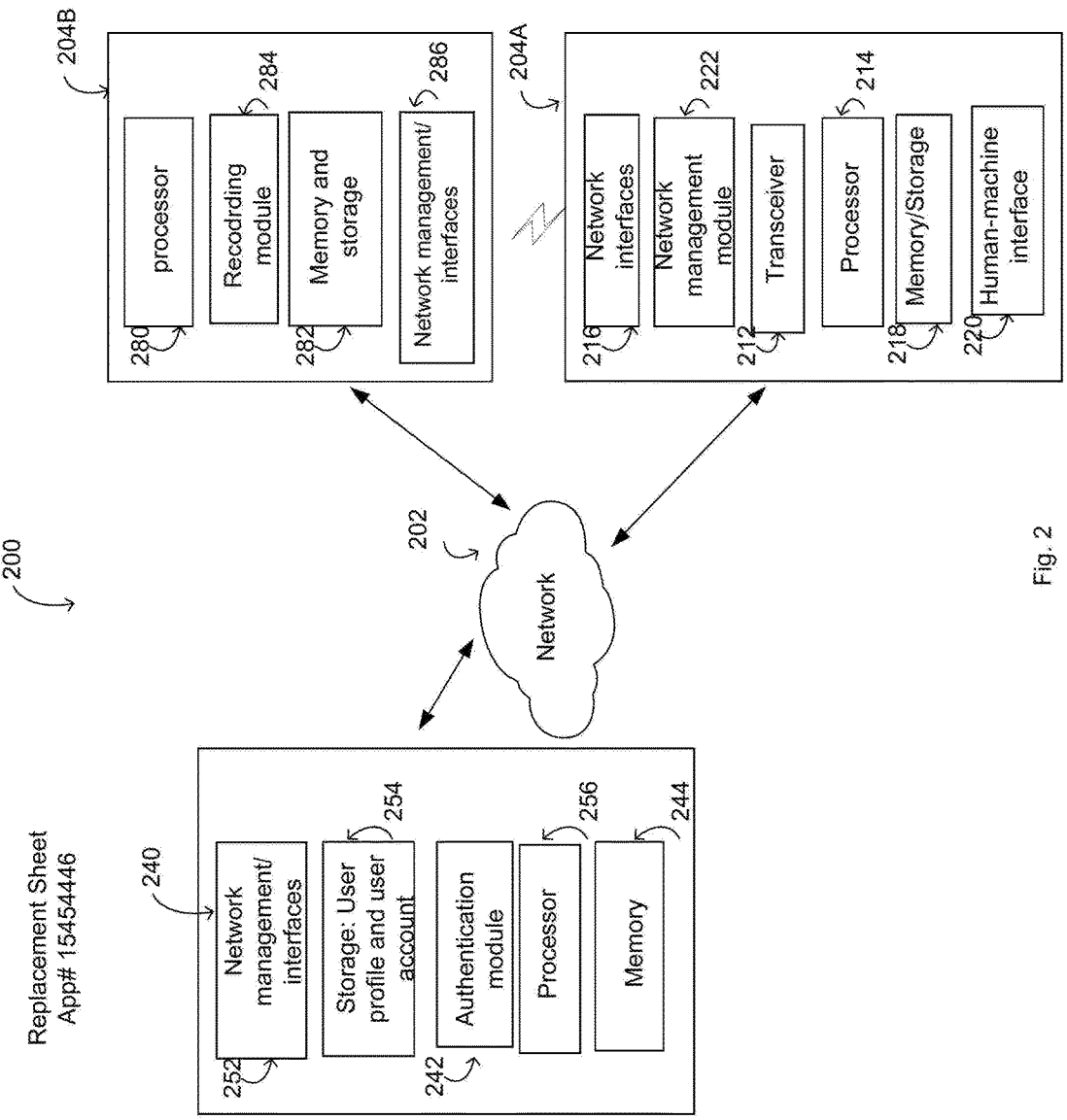
FIG. 2 illustrates an IP camera, a wireless user device and a server in accordance with one or more embodiments of the present disclosure.

FIG. 2 illustrates an IP camera 204B, a wireless user device 204A, network 202 and a server 240, similar to IP camera 104B, wireless user device 204A, network 202 and a server 240 in FIG. 1, respectively, in accordance with one or more embodiments of the present disclosure. Not all of the components depicted in the figure may be used, however, and one or more implementations may include additional components not shown in the figure. Variations in the arrangement and type of the components may be made without departing from the scope of the subject technology. Additional components, different components, or fewer components may be provided.

Computing device 204A, depicted as a wireless user device, includes processor 214, memory/storage 218, transceiver 212, HMI application 220, network interfaces 216, network management module 222. Memory/storage 218 may include a dynamic random-access memory (DRAM) and/or a read-only memory (ROM). memory/storage 218 may provide a temporary location to store data and instructions retrieved and processed by processor 214. memory/storage 218 may include a non-volatile read-and-write memory that stores data and instructions retrieved and processed by processor 214. For example, memory/storage 218 may include magnetic, solid state and/or optical media.

Processor 214 may retrieve and execute instructions from memory/storage 218, in order to perform the processes of the present disclosure. Processor 214 can be a single processor, a multi-core processor, or multiple processors in different implementations. HMI application 220 and network management module 222 may include one or more sets of instructions stored in memory/storage 218 that, when executed by processor 214, cause processor 214 to perform operations described herein.

HMI application 220 may be configured to receive and authenticate user credentials for a WAP similar to WAP 118 in FIG. 1. Further, the HMI 220 may receive user authentication credentials to a user account on a cloud-based service on a server. HMI application 220 requests a UDP packets from network management module to be sent to a WAP such as 118 where the UDP packets are programmed to aid in identifying an access point as an access point of interest. In some aspects, HMI application 220 requests a UDP packets from network management module 222 including the authenticating user credentials to be sent to a WAP such as 118 to aid a wireless user device 104A in joining the local area wireless network. Network management module 222 manages wireless user device 104A device communications with network interfaces 216 and HMI 220. In some aspects, network interface 216 is a machine-interface.

IP camera 204B, recording module 284, processor 280, network management/interfaces module 286, and memory/storage module 282. In some aspects, network management/interface 286 is a machine-interface. Memory/storage 282 may include a dynamic random-access memory (DRAM) and/or a read-only memory (ROM). memory/storage 282 may provide a temporary location to store data and instructions retrieved and processed by processor 280. memory/storage 282 may include a non-volatile read-and-write memory that stores data and instructions retrieved and processed by processor 280. For example, memory/storage 282 may include magnetic, solid state and/or optical media.

Network management/interface module 386 may be configured to manage the discovery of wireless local area networks, such as network 104 in FIG. 1, identifying an access point 118 within the wireless local area network. Network management/interface module 286 may be configured to manage the association process between IP camera 204B and the discovered wireless local area networks. The network management/interfaces module 286 may send a request to a WAP similar to WAP 118 to join wireless local area network 104.

Processor 280 may retrieve and execute instructions from memory/storage module 282, to perform the processes of the present disclosure. Processor 280 can be a single processor, a multi-core processor, or multiple processors in different implementations. In some aspects of the subject technology processor 280 retrieves instruction from memory/storage module 282 to record a recording video, utilizing recording module 284, when one or more sensors are triggered and store the recoding video on memory/storage module 282. Processor 280 may generate an alert message in response to triggering the one or more sensors and communicate the alert message and the video recording to a cloud-based service on a server to associate the alter message and the video recording to a user account of the server. Processor 280 may further have instruction to analyze an image and determine a status of the image as an image of interest to investigate further.

As depicted in FIG. 2, Server 240 includes processor 256, memory 244, storage 254, authentication module 242, bus 258 (not shown) and, one or more network management/interfaces 252. Bus 258 collectively represents system, peripheral, and chipset buses that communicatively connect components of server 240. For instance, bus 258 communicatively connects processor 256, memory 244, storage 254 and network management/interfaces 252. Memory 244 may include a dynamic random-access memory (DRAM) and/or a read-only memory (ROM). Memory 244 may provide a temporary location to store data and instructions retrieved and processed by processor 256.

Storage 254 may include a non-volatile read-and-write memory that stores data and instructions retrieved and processed by processor 256. For example, storage 254 may include magnetic, solid state and/or optical media. Authentication module 242 may be configured to receive and authenticate user credentials of a user account on a cloud-based service where a profile associated with the user account is retrieved from storage 254. Based on the authentication results, authentication module 224 may provide an authentication response to the source of the authentication request, such as the wireless access point 118 and/or wireless user device 204A, upon successful authentication. Authentication module 242 and network management/interfaces module 252 stored in storage 254 may include one or more sets of instructions that, when executed by processor 214, cause processor 214 to perform operations described herein.

Processor 256 may retrieve and execute instructions from memory 244 and/or storage 220, to perform the processes of the subject disclosure. Processor 256 can be a single processor, a multi-core processor, or multiple processors in different implementations. In some aspects of the subject technology processor 280 retrieves instruction from memory 244 and storage module 254 to access an algorithm and/or a database associated with a user account. The algorithm and database are utilized by the processor 280 to perform operations described herein.

Figure 3A:
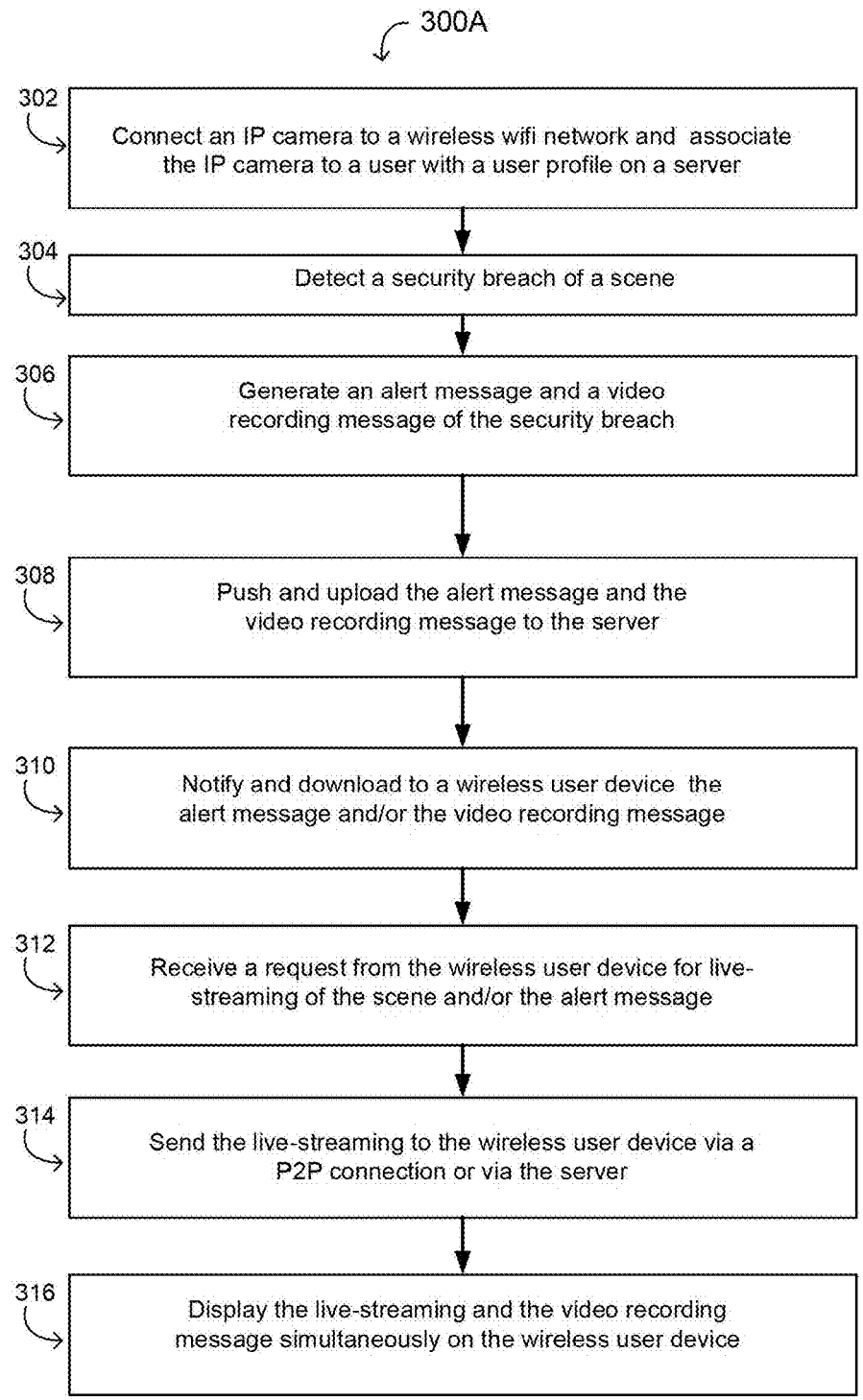
FIG. 3A illustrates an example flow chart of a proposed communication algorithm between the server, the wireless user device and the IP camera in FIG. 1 to generate and display an alert message and a recording video on a wireless user device, in accordance with one or more embodiments of the present disclosure.

FIG. 3A illustrates an example flow chart 300A of a proposed communication algorithm between the server, the wireless user device and the IP camera in FIG. 1, to generate and display an alert message and a recording video on a wireless user device, in accordance with one or more embodiments, of the present disclosure. For explanatory purposes, the example process 300A is described herein with reference to wireless user device 104A, IP camera 104B, and server 140 of FIG. 1; however, the example process 300A is not limited to wireless user device 104A, IP camera 104B, and server 140, and the example process 300A may be performed by one or more components of wireless user device 104A, IP camera 104B, and server 140. Further for explanatory purposes, the blocks of the example process 300A are described herein as occurring in serial, or linearly. However, multiple blocks of the example process 300A may occur in parallel. In addition, the blocks of the example process 300A may be performed a different order than the order shown and/or one or more of the blocks of the example process 300A may not be performed.

Wireless access point 118 broadcasts a message indicating availability for authentication based on network access credentials. The broadcast message may be a beacon announcing the presence of the wireless access point 118 and including information about the wireless local area network associated with the wireless access point 118 such as a network identifier (e.g., SSID). In block 302, IP camera 104B sends a request to wireless access point 118 to access the wireless local area network. The request includes network access authentication information including SSID and/or passphrase. Upon reception of the request to join the wireless local area network, the WAP 118 authenticates the provided SSID and passphrase and grants access to the wireless local area network based on the authentication. Furthermore, IP camera 104B is associated to a user account on a cloud-based service on the server upon authentication of the user account credentials.

IP camera 104B includes or has access to a number of physical-quantity measuring sensors. For example, the sensors maybe motion detection sensors and/or sound detection sensors and the sensors may have adjustable levels of sensitivity. Upon a triggering event to one or more of the sensors in block 304, an alert message and a video recording of the triggering event are generated in block 306. The alert message may be a text message or an audio message. The video recording is a recording of a predetermined length of time, where the recoding includes the incident when the sensor is triggered. In one or more implementations, the recording may include a portion of a recording prior to the moment of the triggering of the sensors providing an insight to the incident prior to the unfolding of the incident. In some aspects, the predetermined length of time is a fixed duration irrespective of the triggering event, or in another aspect, is determined in response to the triggering event.

In block 308, the 1P camera pushes the alert message and the video recording message of the triggering event to a cloud-based service on a server. The alert message and the video recording are associated to the user account on the server. Based on the wireless user devices on the user account associated to the IP camera, a wireless user device is selected. For example, wireless user device 104A maybe the first preference on the user profile associated to the user account. The alert message is then pushed to wireless user device 104A in block 310. In one or more implementations, the alert message and the video recording are pushed to the wireless user device 104A.

The wireless user device 104A in block 312, and in response to the alert message, may send a request to the server to download the video recording and a live-streaming video to the wireless user device 104A. In some aspects, the request to the server is to download the video recording and the live-streaming video to any other wireless user device of choice provided by the wireless user device in response to the alert message. In one or more implementations, upon review of the alert message and the recoding video, the wireless user device 104A may request from the server to download the live-streaming video in addition to the initial video recording of the triggering event.

In block 314, the server, in response to the request for the video recording and the live-streaming video, downloads the video recording, to the wireless user device 104A or to the wireless user device of choice selected and communicated by the user to the server. The server sends a request to the IP camera 104B to send the live-streaming video to wireless user device 104A or any other wireless user device of choice utilizing a peer-to-peer network (P2P) communication channel. Based on a predetermined protocol, if the IP camera 104B fails to establish a communication channel with wireless user device 104A or the wireless user device of choice, the IP camera will start to upload the live-streaming video to the server for the server to forward to the wireless user device 104A or the wireless user device of choice. Upon reception of both the video recording and the live-streaming video; both the video recording and the live-streaming video are displayed simultaneously on a display screen on the wireless user device as depicted in block 316.

Figure 3B:
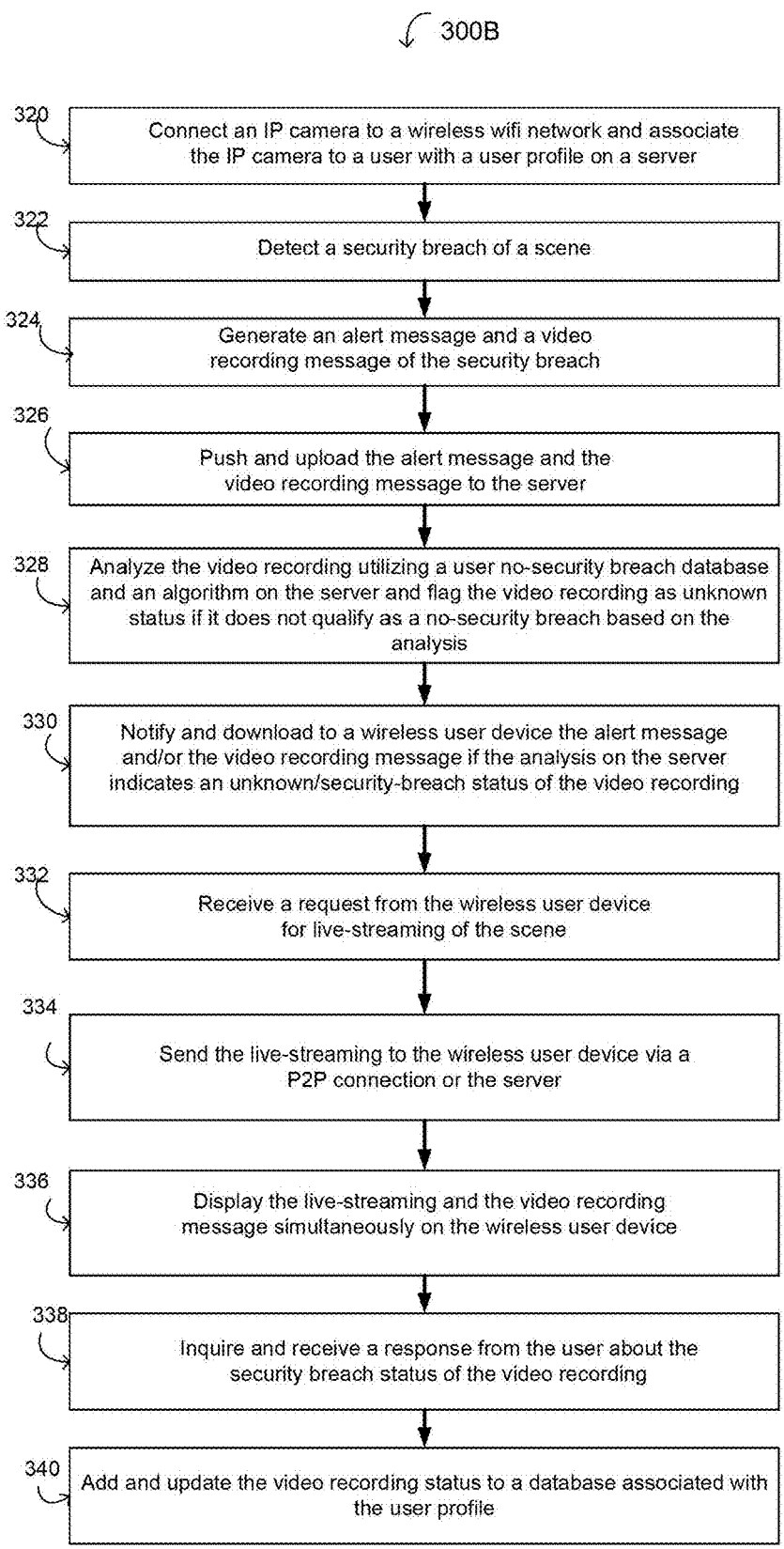
FIG. 3B illustrates an alternative example flow chart of a proposed communication algorithm between the server, the wireless user device and the IP camera in FIG. 1 to generate and display an alert message and a recording video on a wireless user device, in accordance with one or more embodiments of the present disclosure.

FIG. 3B illustrates an alternative example flow chart 300B of a proposed communication algorithm between the server, the wireless user device and the IP camera in FIG. 1 to generate and display an alert message and a recording video on a wireless user device, in accordance with one or more embodiments of the present disclosure. For explanatory purposes; the example process 300B is described herein with reference to wireless user device 104A, IP camera 104B, and server 140 of FIG. 1; however, the example process 300B is not limited to wireless user device 104A, IP camera 104B, and server 140, and the example process 300B may be performed by one or more components of wireless user device 104A, IP camera 104B, and server 140. Further for explanatory purposes, the blocks of the example process 300B are described herein as occurring in serial, or linearly. However, multiple blocks of the example process 300B may occur in parallel. In addition, the blocks of the example process 300B may be performed a different order than the order shown and/or one or more of the blocks of the example process 300B may not be performed.

Wireless access point 118 broadcasts a message indicating availability for authentication based on network access credentials. The broadcast message may be a beacon announcing the presence of the wireless access point 118 and including information about the wireless local area network associated with the wireless access point 118 such as a network identifier (e.g., SSID). In block 320, IP camera 104B sends a request to wireless access point 118 to access the wireless local area network. The request includes network access authentication information including SSID and/or passphrase. Upon reception of the request to join the wireless local area network, the WAP 118 authenticates the provided SSID and passphrase and grants access to the wireless local area network based on the authentication. Furthermore, IP camera 104B is associated to a user account on a cloud-based service on the server upon authentication of the user account credentials.

IP camera 104B includes or has access to a number of a physical-quantity measuring sensors. For example, the sensors maybe motion detection sensors and/or sound detection sensors and the sensors may have adjustable levels of sensitivity. Upon a triggering event being detected by one or more of the sensors in block 322, an alert message and a video recording of the triggering event are generated in block 324. The alert message may be a text message or an audio message. The video recording is a recording of a predetermined length of time, where the recoding includes the incident when the sensor is triggered. In one or more implementations, the recording may include a portion of a recording prior to the moment of the triggering of the sensors providing an insight to the incident prior to the unfolding of the incident. In some aspects, the predetermined length, of time is a fixed duration irrespective of the triggering event, or in another aspect, is determined in response to the triggering event.

In block 326, the IP camera pushes the alert message and the video recording message of the triggering event to a cloud-based service on a server. The alert message and the video recording are associated to the user account on the server. Based on the wireless user devices on the user account associated to the IP camera, a wireless user device is selected. For example, wireless user device 104A may be the first preference on the user profile associated to the user account.

In block 328, an algorithm and a database associated with the user account on the server is utilized to analyze the video recording to determine whether the triggering event represents a security-breach or a non-security-breach or unknown status. In one or more implementations, the algorithm is a machine learning artificial intelligence program or any program that has the potential to learn patterns and make decisions from outside inputs and where the program continues to learn to enhance the algorithm. In some aspects of the technology, the video recording might be an unknown-status, where the algorithm utilizing the database is not able to make a conclusive decision about the status of the video recording, in the event a conclusive decision is not made the video recording is flagged as an unknown-status. For an unknown-status video recording or a video recording that is determined as a security-breach status, an alert message is then pushed to wireless user device 104A in block 330. In one or more implementations, the alert message and the video recording are pushed to the wireless user device 104A.

The wireless user device 104A in block 332, and in response to the alert message, may send a request to the server to download the video recording and a live-streaming video to the wireless user device 104A. In some aspects, the request to the server is to download the video recording and the live-streaming video to any other wireless user device of choice provided by the wireless user device in response to the alert message. In one or more implementations, upon review of the alert message and the recoding video, the wireless user device 104A may request from the server to download the live-streaming video in addition to the initial video recording of the triggering event.

In block 334, the server, in response to the request for the video recording and the live-streaming video, downloads the video recording to the wireless user device 104A or to the wireless user device of choice selected and communicated by the user to the server. The server sends a request to the IP camera 104B to send the live-streaming video to wireless user device 104A or any other wireless user device of choice utilizing a peer-to-peer network (P2P) communication channel. Based on a predetermined protocol, if the IP camera 104B fails to establish a communication channel with wireless user device 104A or the wireless user device of choice. The IP camera will start to upload the live-streaming video to the server for the server to forward to the wireless user device 104A or the wireless user device of choice. Upon reception of both the video recording and the live-streaming video, both the video recording and the live-streaming video are displayed simultaneously on a display screen on the wireless user device as depicted in block 336.

In some aspects of the technology, in block 338, the server will send a message to inquire about the status of the video recording from the user. The message might be a separate message sent to the wireless user device 104A or the wireless user device of choice, where the user is required to identify the video recording, as a security-breach video or a non-security-breach video. The response is then uploaded back to the server by wireless user device 104A or the wireless user device of choice, and the server will update the database associated with the user account with the status of the video recording as shown in block 340.

Figure 3C:
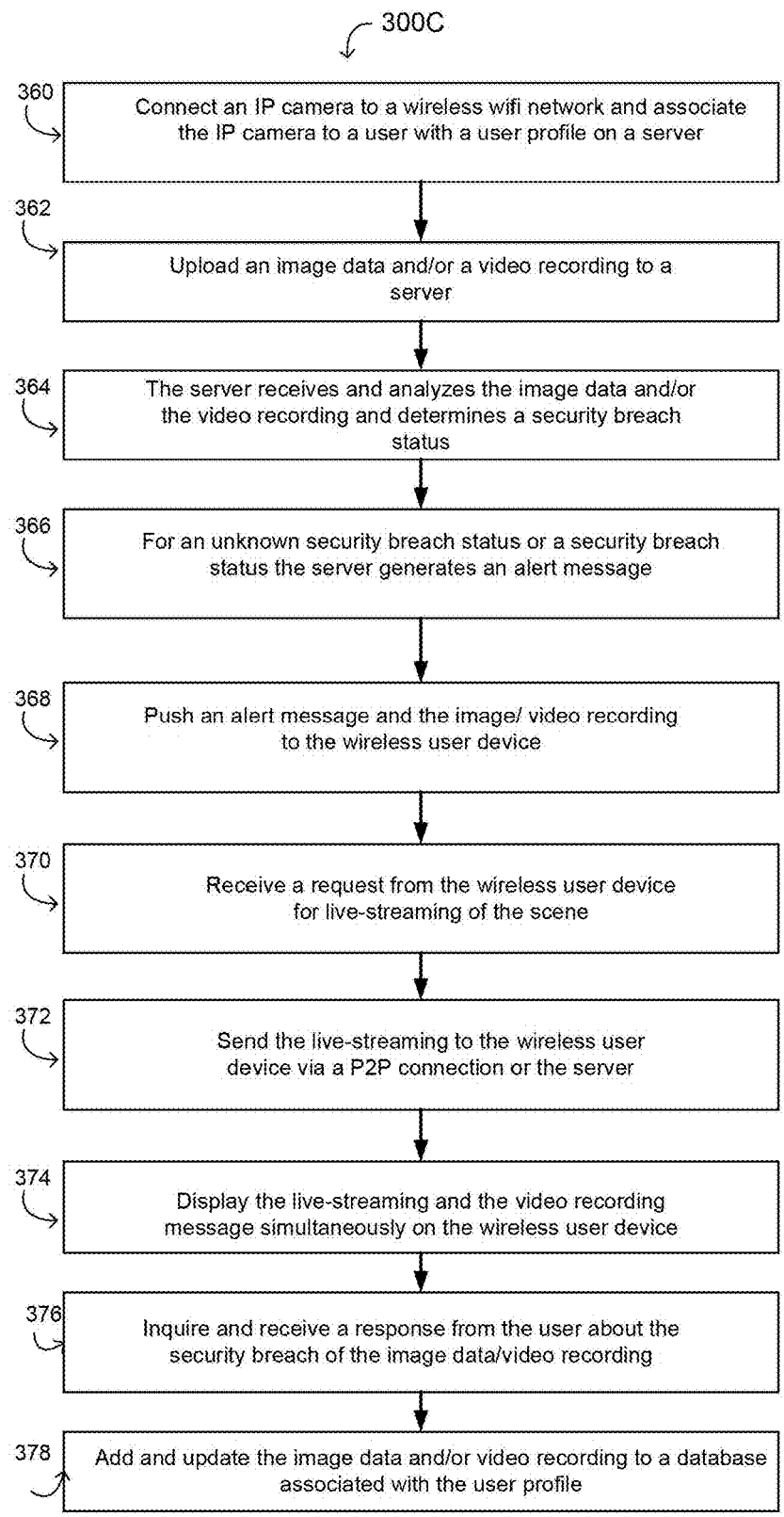
FIG. 3C illustrates a third example flow chart of a proposed communication algorithm between the server, the wireless user device and the IP camera in FIG. 1 to generate and display an alert message and a recording video on a wireless user device, in accordance with one or more embodiments of the present disclosure.

FIG. 3C illustrates a third example flow chart 300C of a proposed communication algorithm between the server, the wireless user device and the IP camera in FIG. 1 to generate and display an alert message and a recording video on a wireless user device, in accordance with one or more embodiments of the present disclosure. For explanatory purposes, the example process 300C is described herein with reference to wireless user device 104A, IP camera 104B, and server 140 of FIG. 1, however, the example process 300C is not limited to wireless user device 104A, IP camera 104B, and server 140, and the example process 300C may be performed by one or more components of wireless user device 104A, IP camera 104B, and server 140. Further for explanatory purposes, the blocks of the example process 300C are described herein as occurring in serial, or linearly. However, multiple blocks of the example process 300C may occur in parallel. In addition, the blocks of the example process 300C may be performed a different order than the order shown and/or one or more of the blocks of the example process 300C may not be performed.

Wireless access point 118 broadcasts a message indicating availability for authentication based on network access credentials. The broadcast message may be a beacon announcing the presence of the wireless access point 118 and including information about the wireless local area network associated with the wireless access point 118 such as a network identifier (e.g., SSID). In block 360, IP camera 104B sends a request to wireless access point 118 to access the wireless local area network. The request includes network access authentication information including SSID and/or passphrase. Upon reception of the request to join the wireless local area network, the WAP 118 authenticates the provided SSID and passphrase and grants access to the wireless local area network based on the authentication. Furthermore, IP camera 104B is associated to a user account on a cloud-based service on the server upon authentication of the user account credentials.

In some aspects of the technology, IP camera 104B analyzed images of live-streaming video and an image of interest may be detected as an image that might be a representation of a security-breach. Upon the detection of the image by the IP camera, in block 362, the image of interest and/or a video recording are generated. The video recording is a recording of a predetermined length of time, where the recoding includes the incident when the sensor is triggered. In one or more implementations, the recording may include a portion of a recording prior to the moment of the triggering of the sensors providing an insight to the incident prior to the unfolding of the incident. The IP camera pushes the image of interest and/or the video recording message of the triggering event to a cloud-based service on a server. The image of interest and the video recording, are associated to the user account on the server. Based on the wireless user devices on the user account associated to the IP camera, a wireless user device is selected. For example, wireless user device 104A maybe the first preference on the user profile associated to the user account.

In block 364, an algorithm and a database associated with the user account on the server is utilized to analyze the image of interest and/or the video recording to determine whether the image of interest represents a security-breach or a non-security-breach or an unknown status. In one or more implementations, the algorithm is a machine learning artificial intelligence program or any program that has the potential to learn patterns and make decisions from outside inputs and where the program continues to learn to enhance the algorithm. In some aspects of the technology, the image of interest and/or the video recording might be an unknown-status, where the algorithm utilizing the database is not able to make a conclusive decision about the status of the image of interest and/or the video recording, in the event a conclusive decision is not made the image of interest and/or the video recording is flagged as an unknown-status. For an unknown-status the image of interest and/or video recording or an image of interest and/or video recording that is determined as a security-breach status, an alert message, generated by the server or the IP camera 104B, is then pushed to wireless user device 104A in block 368. In one or more implementations, the alert message and, the video recording are pushed to the wireless user device 104A.

The wireless user device 104A in block 370, and in response to the alert message, may send a request to the server to download the video recording and a live-streaming video to the wireless user device 104A. In some aspects, the request to the server is to download the video recording and the live-streaming video to any other wireless user device of choice provided by the wireless user device in response to the alert message. In one or more implementations, upon review of the alert message and the recoding video, the wireless user device 104A may request from the server to download the live-streaming video in addition to the initial video recording of the tiggering event.

In block 372, the server, in response to the request for the video recording and the live-streaming video, downloads the video recording to the wireless user device 104A or to the wireless user device of choice selected and communicated by the user to the server. The server sends a request to the IP camera 104B to send the live-streaming video to wireless user device 104A or any other wireless user device of choice utilizing a peer-to-peer network (P2P) communication channel. Based on a predetermined protocol, if the IP camera 104B fails to establish a communication channel with wireless user device 104A or the wireless user device of choice. The IP camera will start to upload the live-streaming video to the server for the server to forward to the wireless user device 104A or the wireless user device of choice. Upon reception of both the video recording and the live-streaming video, both the video recording and the live-streaming video are displayed simultaneously on a display screen on the wireless user device as depicted in block 374.

In some aspects of the technology, in block 376, the server will send a message to inquire about the status of the video recording from the user. The message might be a separate message sent to the wireless user device 104A or the wireless user device of choice, where the user is required to identify the video recording as a security-breach video or a non-security-breach video. The response is then uploaded back to the server by wireless user device 104A or the wireless user device of choice, and the server will update the database associated with the user account with, the status of the video recording as shown in block 378.

Figure 4A:
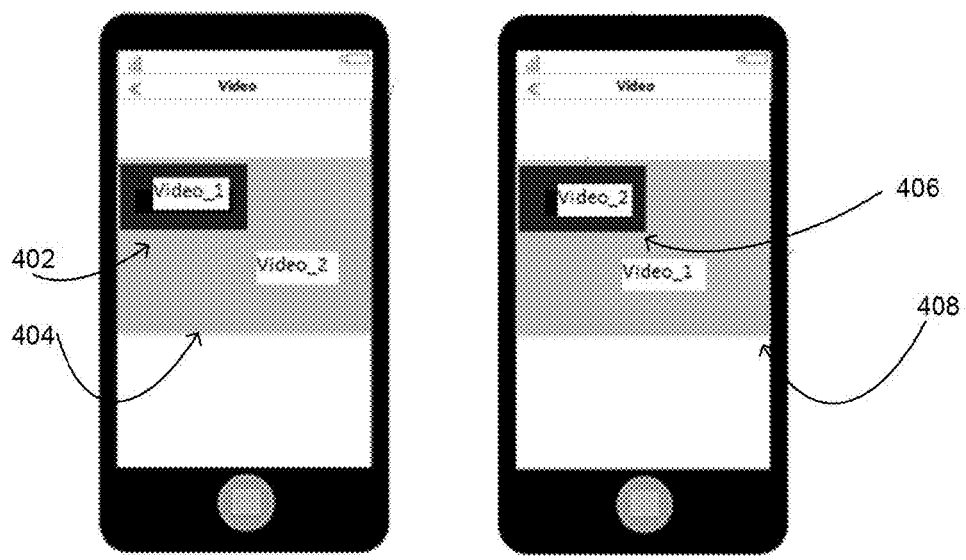
FIG. 4A and FIG. 4B illustrates exemplary locations of displaying a video recording and a live-streaming video in accordance with one or more embodiments of the present disclosure.
Figure 4B:
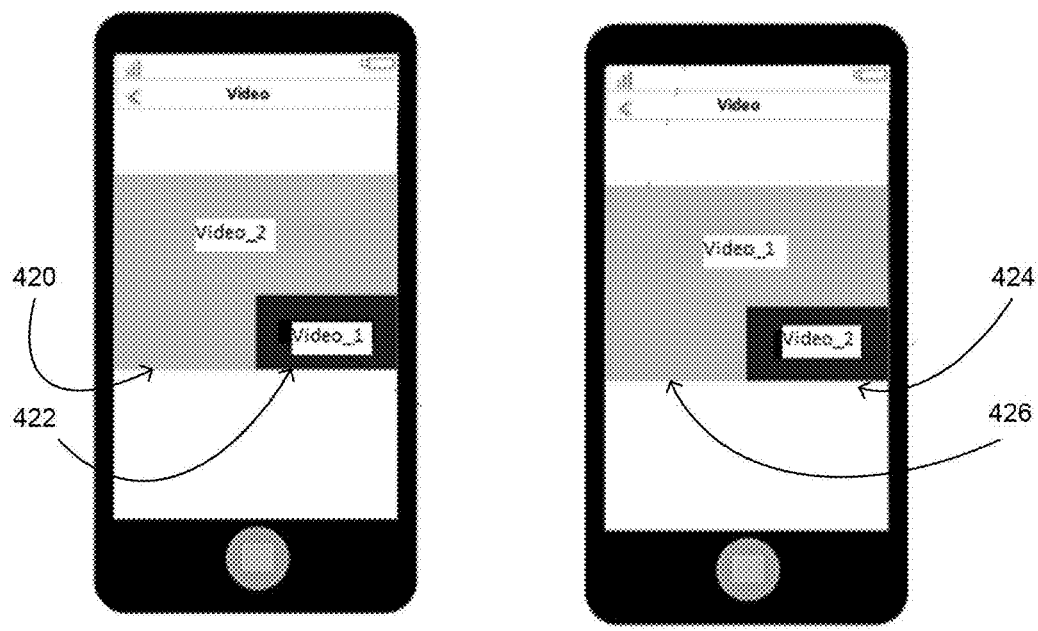

FIG. 4A and FIG. 4B illustrates exemplary locations of displaying a video recording and a live-streaming video in accordance with one or more embodiments of the present disclosure. On the wireless user device 104A or a wireless user device of choice, the video recording and the live-streaming, video are displayed simultaneously on a display screen. The location of the video recording and the live-streaming video are adjustable as shown in FIG. 4A, by way of illustration only and not by way of limitation, where video_1 (402 and 408) is the video recording and video_2 (404 and 406) is the live-streaming video. Similarly, FIG. 4B, by way of illustration only and not by way of limitation, represents an exemplary location for video_1 (422 and 426) and video_2 (420 and 424), where video_1 is the video recording and video_2 is the live-streaming video. The exemplary illustrated locations of FIG. 4A and FIG. 4B demonstrate a display overlaid on another display, where part of the larger display (e.g., 404, 408, 420 or 426) are not visible due to the location of the smaller display (e.g., 402, 406, 422 or 424 respectively).

Figure 4C:
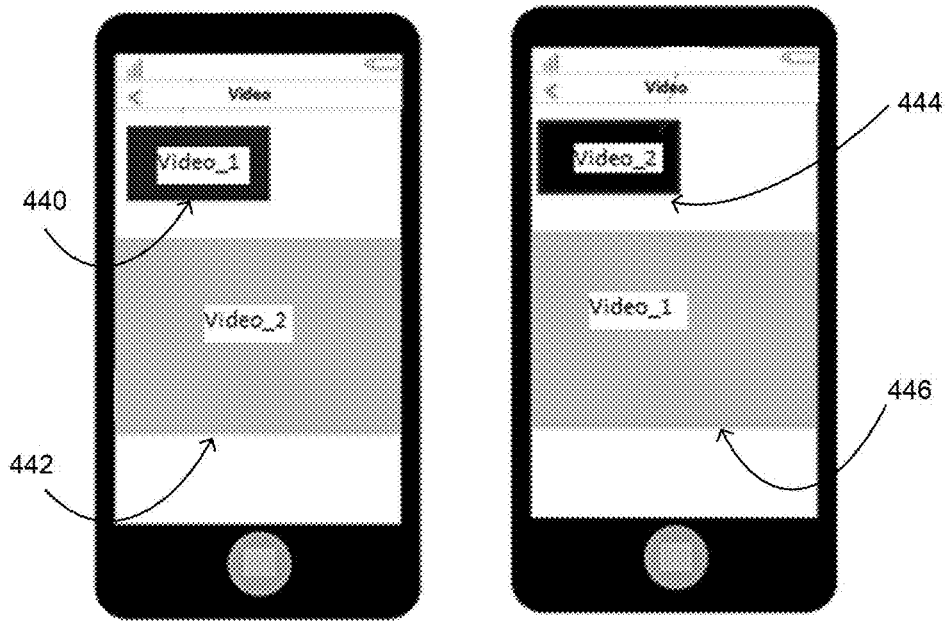
FIG. 4C and FIG. 4D illustrates an alternative exemplary location of displaying a video recording and a live-streaming video in accordance with one or more embodiments of the present disclosure.
Figure 4D:
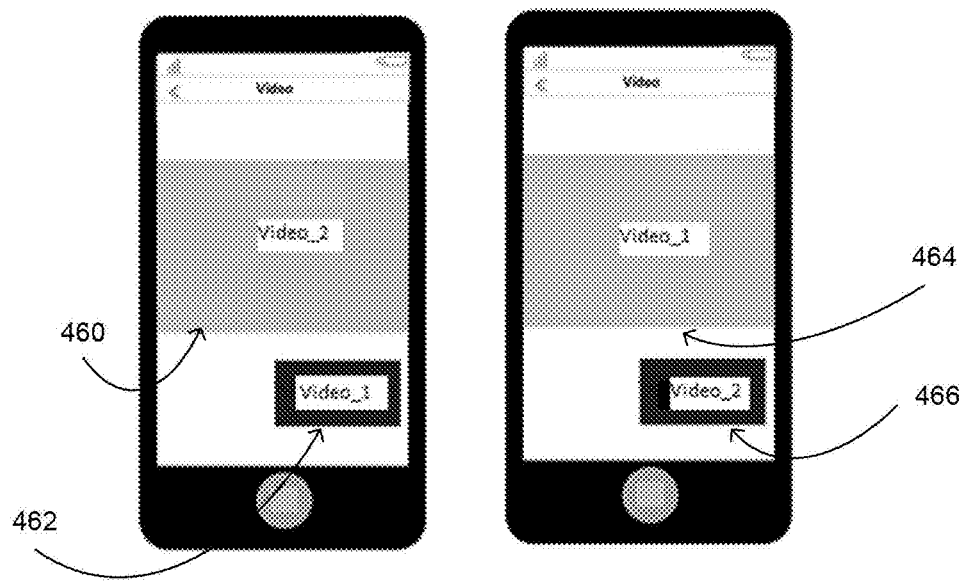

FIG. 4C and FIG. 4D illustrates alternative exemplary location of displaying a video recording and a live-streaming video in accordance with one or more embodiments of the present disclosure. On the wireless user device 104A or a wireless user device of choice, the video recording and the live-streaming video are displayed simultaneously on a display screen. The location of the video recording and the live-streaming video are adjustable as shown in FIG. 4C, by way of illustration only and not by way of limitation, where video_1 (440 and 446) is the video recording and video_2 (442 and 444) is the live-streaming video. Similarly, FIG. 4D, by way of illustration only and not by way of limitation, represents an exemplary location for video_1 (462 and 464)

and video_2 (460 and 466), where video_1 is the video recording and video_2 is the live-streaming video. The exemplary illustrated locations of FIG. 4C and FIG. 4D demonstrate a display on display where the larger display (e.g., 442, 446, 460 or 464) are visible since the location of the smaller display (e.g., 440, 444, 462 or 466 respectively) is outside the premise of the larger display.

Figure 5:
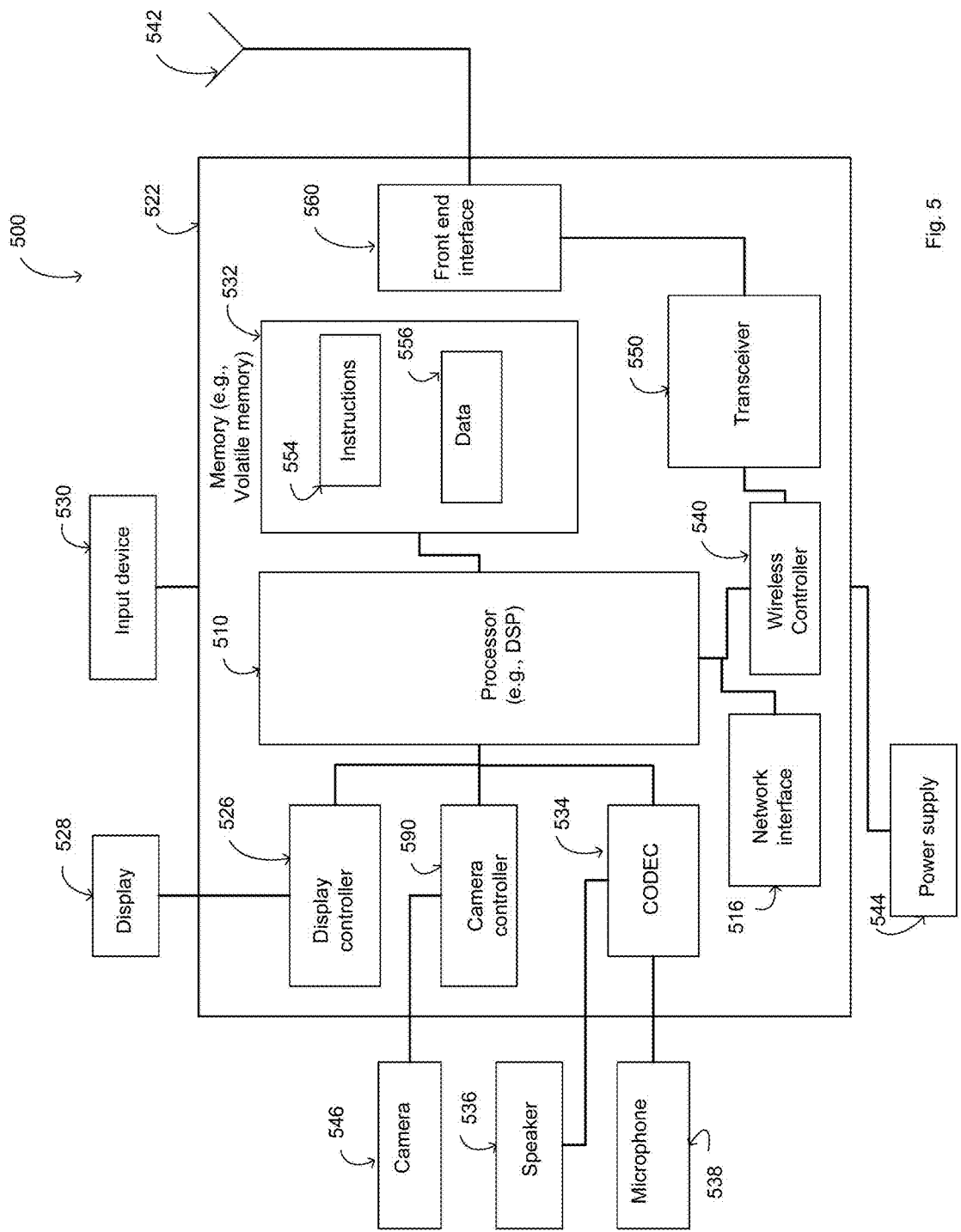
FIG. 5 illustrates conceptually an example electronic system with which some implementations of the present disclosure may be implemented.

FIG. 5 illustrates conceptually an example electronic system 500 with which some implementations of the present disclosure may be implemented. Electronic system 500 may be a gateway device, a set-top box, a computer (e.g., desktop computer or laptop computer), a phone, a personal digital assistant (PDA), a server, a switch, a router, a base station, a receiver, or any other sort of electronic device that transmits signals over a network, such as electronic devices embedded in smart appliances and other smart systems. The electronic system 500 may be, and/or may be a part of, the proxy device and/or one or more of the smart devices. For example, the electronic system 500 may be a sensor, an active device, and/or an actuator. Such an electronic system includes various types of computer readable media and interfaces for various other types of computer readable media.

The electronic system 500 may include a processor 510 such as a processor 212 and processor 214 and processor 256 as depicted in FIG. 2. The processor 510 may be coupled to a computer-readable storage medium, such as a memory 532 (e.g., a non-transitory computer-readable medium or machine-readable medium), via a transceiver 550, Moreover, as depicted in FIG. 5, the processor 510 may be external transceiver 550. For example, the processor 510 may be "off-chip" with respect to the transceiver 550. In another embodiment, the processor 510 and the transceiver 550 are integrated within a system-in-package or system-on-chip device 522, as explained further below.

The memory 532 may store instructions 554 that are executable by the processor 510, data 556 that is accessible to the processor 510, or a combination thereof. In a particular embodiment, the memory 532 is a volatile memory that is accessible to the processor via transceiver 550. FIG. 5 also shows a display controller 526 that is coupled to the processor 510 and to a display 528. A coder/decoder (CODEC) 534 may also be coupled to the processor 510. A speaker 536 and a microphone 538 may be coupled to the CODEC 534. FIG. 5 also indicates that a wireless controller 540 may be coupled to the processor 510. The wireless controller may be further coupled to an antenna 542 via a transceiver 550. A camera 546 may be coupled to a camera controller 590. The camera controller 590 may be coupled to the processor 510.

In a particular embodiment, the processor 510, the memory 532, the display controller 526, the camera controller 590, the CODEC 534, the wireless controller 540, and the transceiver 550 are included in the system-in-package or system-on-chip device 522. An input device 530 and a power supply 544 may be coupled to the system-on-chip device 522. Moreover, in a particular embodiment, and as illustrated in FIG. 5, the display 528, the input device 530, the camera 546, the speaker 536, the microphone 538, the antenna 542, and, the power supply 544 are external to the system-on-chip device 522. However, each of the display 528, the input device 530, the camera 546, the speaker 536, the microphone 538, the antenna 542, and the power supply 544 may be coupled to a component of the system-on-chip device 522. As a particular example, the processor 510 and the memory 532 are coupled to transceiver 550.

In connection with the present disclosure, a computer-readable storage medium (e.g., the memory 532) stores data (e.g., the data 556) that is accessible to a processor (e.g., the processor 510) during modes of operation of transceiver 550. The data 556 may be a method instruction as depicted in FIG. 3A, FIG. 3B and FIG. 3C. The method instructions are executable by processor 510, where the instructions include steps on how to operate and configure the transceiver 550. Finally, as depicted in FIG. 5, electronic system 500 couples to a network through a network interface 516. In this manner, the electronic system 500 may be a part of a network of computers (for example, a local area network (LAN), a wide area network (WAN), or an Intranet, or a network of networks, for example, the Internet. Any or all components of electronic system 500 may be used in conjunction with the subject disclosure. The network interface 516 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

Those of skill in the art will appreciate that the foregoing disclosed systems and functionalities may be designed, and configured into computer files (e.g. RTL, GDSII, GERBER, etc.) stored on computer-readable media or a machine-readable medium. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the electronic system 500, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components maybe implemented as hardware components and vice-versa.

Software, in accordance with the present disclosure, such as program code and/or data, may be stored on one or more computer-readable medium or machine-readable medium (alternatively referred to as computer-readable storage media, machine-readable media, or machine-readable storage media). It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer". "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B. or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element, is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled, in the art to make or use the disclosed embodiments. Various modifications to these embodiments will be readily apparent to those skilled in the art, and the principles defined herein may be applied to other embodiments without departing, from the scope of the disclosure. Thus, the present disclosure is not intended to be limited to the embodiments shown herein but is to be accorded the widest scope possible consistent with the principles and novel features as defined by the following claims.

What is claimed is:

1. A wireless user device comprising:
  one or more processors;
  a machine-readable medium comprising instructions stored therein, which, when executed by the one or more processors cause the one or more processors to perform operations comprising:
  sending, by the wireless user device, a request to authenticate a user account on a cloud-based service, wherein the request comprises user credentials to the user account on the cloud-based service, wherein the cloud-based service is associated with a server, and wherein the wireless user device is associated to the user account in response to a successful authentication of the user credentials;

receiving, from the server, an alert message associated with a live-scene, wherein the alert message and a video recording are generated in response to a triggering event detected by one or more sensors of a device;

sending, in response to the alert message, to the server a request to forward to the wireless user device the video recording of the triggering event and a live-streaming video of the live-scene;

receiving the video recording and the live-streaming video subsequent to transmitting the request; and displaying the video recording and the live-streaming video simultaneously on the wireless user device, wherein a location of the video recording within a displaying screen of the wireless user device and a location of the live-streaming video within the displaying screen of the wireless user device are adjustable; and wherein simultaneous playback of both the live-streaming video and the video recording of the triggering event occur on the displaying screen of the wireless user device; and wherein the video recording presents video prior to the triggering event and video at the time of the triggering event for a predetermined length of time to allow a user to view one or more images of the triggered event and select the video recording for storing; and wherein the alert message comprises an inquiry to a user of a classification for the video recording, wherein the classification marks the video recording as a security-breach or a non-security-breach, and wherein the classification is communicated to the server.

2. The wireless user device of claim 1, wherein the live-streaming video is received by the wireless user device from the device via an established peer-to-peer (P2P) communication channel, and wherein, in response to failure to establish a P2P communication channel between the wireless user device and the device, the live-streaming video is received by the wireless user device through the server.

3. The wireless user device of claim 2, wherein the live-streaming video is received through the server until a P2P communication channel is established.

4. The wireless user device of claim 1, wherein the user account comprises prioritization information of wireless user devices to receive the alert message and the video recording.

5. The wireless user device of claim 1, wherein the triggering event is detected by at least one of a motion sensor, an audio sensor, or an image sensor.

6. The wireless user device of claim 5, wherein the alert message and the video recording are received by the wireless user based on a decision to push the alert message and the video recording having been made based at least on content of the alert message and/or the video recording.

7. The wireless device of claim 1, wherein the video recording has a length of a predetermined time duration.

8. A method comprising:
receiving, by a server, an alert message and a video recording in response to a triggering event of a live-scene detected by one or more sensors of a device;
associating the alert message and the video recording to a user account on a cloud-based service on the server;
pushing the alert message to a wireless user device associated with the user account;
receiving a user request from the wireless user device, the user request being for the video recording and a live-streaming video of the live-scene; and
providing the video recording and the live-streaming video for display by the wireless user device in response to the user request; and
wherein simultaneous playback of both the live-streaming video and the video recording of the triggering event occur on the displaying screen of the wireless user device; and
wherein the video recording presents video prior to the triggering event and video at the time of the triggering event for a predetermined length of time to allow a user to view one or more images of the triggered event and select the video recording for storing; and
wherein the alert message comprises an inquiry to a user of a classification for the video recording, wherein the classification marks the video recording as a security-breach or a non-security-breach, and wherein the classification is communicated to the server.

9. The method of claim 8, wherein the live-streaming video is provided to the wireless user device from the device via an established peer-to-peer (P2P) communication channel, and wherein, in response to failure to establish a P2P communication channel between the wireless user device and the device, the live-streaming video is provided to the wireless user device through the server.

10. The method of claim 9, wherein the live-streaming video is provided through the server until a P2P communication channel is established.

11. The method of claim 8, wherein the user account comprises prioritization information of wireless user devices to receive the alert message and the video recording.

12. The method of claim 8, wherein the triggering event is detected by at least one of a motion sensor, an audio sensor, or an image sensor.

13. The method of claim 12, wherein prior to pushing the alert message and the video recording to the wireless user device, the video recording is assessed by the server and a decision is made on whether to push the alert message and the video recording to the wireless user device based on the assessment.

14. The method of claim 13, wherein the assessment is based on an algorithm and a database associated with the user account.

15. The method of claim 14, wherein the server utilizes the classification in enhancing the algorithm and the database associated with the user account and wherein the algorithm is a machine learning program.

16. The method of claim 8, further comprising:
receiving, from the wireless user device, a request to authenticate the user account on the cloud-based service; wherein the request comprises user credentials to the user account on the cloud-based service and wherein the cloud-based service is associated with the server; and
associating the wireless user device to the user account in response to a successful authentication of the user credentials.

17. The method of claim 8, further comprising receiving a request to associate the device to the user account.

18. The method of claim 8, wherein the alert message and the video recording are received by the wireless user based on a decision to push the alert message and the video recording having been made based at least on content of the alert message and/or the video recording.

19. A non-transitory machine-readable medium comprising instructions stored therein, which, when executed by one or more processors of a processing system cause the one or more processors to perform operations comprising:
sending, by the wireless user device, a request to authenticate a user account on a cloud-based service, wherein the request comprises user credentials to the user account on the cloud-based service, wherein the cloud-based service is associated with a server, and wherein the wireless user device is associated to the user account in response to a successful authentication of the user credentials;
receiving, from the server, an alert message associated with a live-scene, wherein the alert message and a video recording are in response to a triggering event detected by one or more sensors of a device;
transmitting, in response to the alert message, to the server a request to forward to the wireless user device the video recording and a live-streaming video of the live-scene;
receiving the video recording and the live-streaming video subsequent to transmitting the request; and
displaying the video recording and the live-streaming video simultaneously on the wireless user device, wherein a location of the video recording within a displaying screen and a location of the live-streaming video within the displaying screen are adjustable; and
wherein simultaneous playback of both the live-streaming video and the video recording of the triggering event occur on the displaying screen of the wireless user device; and
wherein the video recording presents video prior to the triggering event and video at the time of the triggering event for a predetermined length of time to allow a user to view one or more images of the triggered event and select the video recording for storing; and
wherein the alert message comprises an inquiry to a user of a classification for the video recording, wherein the classification marks the video recording as a security-breach or a non-security-breach, and wherein the classification is communicated to the server;
wherein the alert message comprises an inquiry to a user of a classification for the video recording, wherein the classification marks the video recording as a security-breach or a non-security-breach, and wherein the classification is communicated to the server.

20. The non-transitory machine-readable medium of claim 19, wherein the live-streaming video is received by the wireless user device from the device via an established peer-to-peer (P2P) communication channel, and wherein, in response to failure to establish a P2P communication channel between the wireless user device and the device, the live-streaming video is received by the wireless user device through the server.

21. The non-transitory machine-readable medium of claim 20, wherein the live-streaming video is received through the server until a P2P communication channel is established.

22. The non-transitory machine-readable medium of claim 19, wherein the user account comprises prioritization information of wireless user devices to receive the alert message and the video recording.

23. The non-transitory machine-readable medium claim 19, wherein the triggering event is detected by at least one of a motion sensor, an audio sensor, or an image sensor.

24. The non-transitory machine-readable medium of claim 23, wherein the alert message and the video recording are received by the wireless user based on a decision to push the alert message and the video recording having been made based at least on content of the alert message and/or the video recording.

25. The non-transitory machine-readable medium of claim 24, wherein the triggering event is detected by at least one of a motion sensor, an audio sensor, or an image sensor.

26. The non-transitory machine-readable medium of claim 25, wherein the video recording has a length of a predetermined time duration.

* * * * *